United States Patent [19]

Pirooz

[11] 3,914,517

[45] Oct. 21, 1975

[54] METHOD OF FORMING A CONDUCTIVELY COATED CRYSTALLINE GLASS ARTICLE AND PRODUCT PRODUCED THEREBY

[75] Inventor: Perry P. Pirooz, Toledo, Ohio

[73] Assignee: Owens-Illinois, Inc., Toledo, Ohio

[22] Filed: Dec. 19, 1973

[21] Appl. No.: 426,378

Related U.S. Application Data

[62] Division of Ser. No. 118,201, Feb. 23, 1971, Pat. No. 3,802,892.

[52] U.S. Cl. ........................ 428/433; 65/32; 65/33; 65/60; 427/96; 427/123; 427/383; 428/457

[51] Int. Cl.$^2$................ C03B 32/00; C03C 17/00; B44D 1/02

[58] Field of Search .............. 65/33, 32, 60; 106/52; 161/1; 117/227

[56] References Cited

UNITED STATES PATENTS

| | | | |
|---|---|---|---|
| 2,733,158 | 1/1956 | Tiede | 65/33 X |
| 2,920,971 | 1/1960 | Stookey | 65/33 |
| 2,972,543 | 2/1961 | Beals et al. | 65/33 X |
| 3,117,881 | 1/1964 | Henry et al. | 65/33 X |
| 3,205,079 | 9/1965 | Stookey | 65/33 X |
| 3,231,456 | 1/1966 | McMillan et al. | 35/33 X |
| 3,240,661 | 3/1966 | Babcock | 65/33 X |
| 3,420,645 | 1/1969 | Hair | 65/33 X |
| 3,464,806 | 9/1969 | Seki et al. | 65/32 |
| 3,490,887 | 1/1970 | Herczug et al. | 65/33 |
| 3,528,828 | 9/1970 | Smith | 65/33 X |
| 3,557,576 | 1/1971 | Baum | 65/33 |
| 3,586,521 | 6/1971 | Duke | 65/33 X |
| 3,639,113 | 2/1972 | Aslanova | 65/32 |
| 3,704,110 | 11/1972 | Finn | 65/32 |
| 3,790,360 | 2/1974 | Kato et al. | 65/32 |

*Primary Examiner*—S. Leon Bashore
*Assistant Examiner*—Frank W. Miga
*Attorney, Agent, or Firm*—Charles S. Lynch; E. J. Holler

[57] ABSTRACT

Provided are three distinct crystallizable copper-bearing alumina-silicate glass compositions. When heat treated during or subsequent to crystallization in an oxidizing atmosphere a copper oxide layer is formed upon the surface of the glass. Subsequent reduction of this layer to a metallic copper results in a strongly adherent film of copper upon a glass-ceramic substrate which may be further processed for use in microelectronic devices and printed circuit boards. The compositions, either crystallized or in vitreous state, are easily drilled using ultrasonic techniques. When such holes are formed prior to heat treatment, subsequent oxidation and reduction results in the copper film extending through the holes, thus providing a conductive lead from one side of the ceramic substrate to the other.

14 Claims, No Drawings

METHOD OF FORMING A CONDUCTIVELY COATED CRYSTALLINE GLASS ARTICLE AND PRODUCT PRODUCED THEREBY

REFERENCE TO A RELATED APPLICATION

This application is a division of copending application Ser. No. 118,201 filed Feb. 23, 1971, now U.S. Pat. No. 3,802,892, issued Apr. 9, 1974.

This application relates to crystallizable glass compositions and methods of using same. More particularly, this invention relates to glass compositions capable of forming, in situ thereupon, a copper layer useful in the microelectronic and printed circuitry art.

Patterns of conductor metals, such as copper, have long been used in the microelectronic and printed circuit arts such as for making multilead conductor patterns in integrated circuitry packages or for making printed circuit boards. Generally speaking, such patterns are formed by, at least initially, providing a separate layer of the conductor metal upon a separate substrate and thereafter attempting to adhere the two layers together. While somewhat successful, a major problem in the art has been to obtain a substrate material which is sufficiently compatible with the known conductor materials to provide good adhesion without unduly sacrificing other necessary mechanical and electrical properties. That is to say, while several materials have been developed which are compatible with conductor materials, they generally sacrifice other mechanical (e.g. high temperature strength) and electrical properties in order to obtain compatibility. On the other hand, other materials have achieved mechanical properties and electrical properties but they are usually achieved only at the expense of compatibility and the ability to obtain adhesion especially under humid or high temperature conditions.

One approach for solving this problem has been to develop a glass ceramic substrate, which upon selected heat treatment will cause conductor metal ions within its composition to migrate to its surface. This in situ conductor surface layer formation with ceramics of requisite expansions generally achieve good adhesion and high temperature strength characteristics. Such an approach is exemplified by U.S. Pat. No. 3,231,456. In this patent two specific types of copper-bearing, phosphorous pentoxide nucleated glasses are heat treated first in an oxidizing atmosphere under closely controlled conditions to crystallize the glass and to cause migration of copper ions to the surface of the glass-ceramic so formed. Thereafter, the glass-ceramic is heat treated under tightly controlled conditions in a reducing atmosphere to form a conductive copper film on the surface. Such a copper film is coated with a thin siliceous insulating layer and before use as a conductive device, the siliceous layer must be removed as for example with an HF etch. While achieving, generally speaking, good adhesion due to in situ copper migration, the need for an HF etch adds additional expense to the process. Furthermore, and as will be more fully illustrated hereinafter, the film was essentially non-conductive.

U.S. Pat. No. 3,490,887 also discloses the ability of copper ions to migrate to the surface of a glass ferroelectric material and form, after heat treatment in a reducing atmosphere, a metallic copper conductive coating thereupon. This patent, of course, deals with ferroelectric materials generally of the rather exotic barium titinate and niobate type, which materials are difficult to make under the best of controlled heat-treatments. Furthermore, because of the difficulty of forming large structures from these and other ferroelectrics and because of other factors such as cost of materials, etc., such materials are generally not suitable for use as microelectronic substrates or printed circuit boards.

In view of the above, it is apparent that there exists a definite need in the art for new glass compositions which can be used in the microelectronic and printed circuit arts to overcome the stated problems experienced therein.

Generally speaking, this invention fulfills this need in the art by providing certain copper-bearing crystallizable glass compositions of the alumina-silicate type which are capable of mechanically and electronically performing as substrates in the microelectronic and/or printed circuitry art and which are capable of forming, in situ during heat treatment, a tightly adhered conductive copper surface layer not overcoated with a siliceous insulating layer. As another aspect of this invention there is provided a process of using these glass compositions to form substrates having holes therein which are in situ copper coated to electronically connect selected portions of different sides of the substrate. Such a process finds unique applicability in forming substrates for "flip chip" or beam lead integrated circuit packages as more fully described hereinafter.

The copper-bearing crystallizable glass compositions contemplated by this invention are alumina-silicates generally classifiable into three types as follows:

| Constituent | Approx. Wt. % |
|---|---|
| $SiO_2$ | 25–35 |
| $Al_2O_3$ | 5–13 |
| CaO | 3–9 |
| MgO | 0–7 |
| $Na_2O$ | 10–20 |
| $K_2O$ | 0–10 |
| $Na_2O + K_2O$ | 15–25 |
| $TiO_2$ | 15–25 |
| $ZrO_2$ | 0–5 |
| CuO | 3–7 |
| BaO | 0–5 |

Preferably, at least about 90% by weight of the composition is made up of $SiO_2$, $Al_2O_3$, CaO, $Na_2O$, $TiO_2$, CuO, and $K_2O$ if present. A particularly preferred glass composition of Type I consists of:

Glass Composition A

| Constituent | Approx. Wt. % |
|---|---|
| $SiO_2$ | 30 |
| $Al_2O_3$ | 10 |
| MgO | 4 |
| CaO | 6 |
| BaO | 2 |
| $ZrO_2$ | 3 |
| $TiO_2$ | 20 |
| CuO | 5 |
| $Na_2O$ | 15 |
| $K_2O$ | 5 |

Properties of Product (Cu layer = about 1–3 mils thick)

| | |
|---|---|
| Coeff. of Exp. ($\times 10^{-7}$ cm/cm/°C, 0–300°C) | |
| glass | 110 |
| Glass-ceramic | 128 |
| sheet resistance (ohms/sq.) | 0.028 |
| solderability | excellent |
| adhesion (stand. pull test lbs. pull 0.1 in pad) | 7.6 |

-Continued

Glass Composition A

| Constituent | Approx. Wt. % |
|---|---|
| dielectric constant (K) | 21.3 |
| dissipation factor (D) % | 19.2 |
| loss factor (K × D) | 4.1 |
| pred. cryst. phase = | NaCa silicate |

TYPE II

| Constituent | Approx. Wt. % |
|---|---|
| $SiO_2$ | 40–50 |
| $Al_2O_3$ | 15–25 |
| $Na_2O$ | 10–20 |
| $K_2O$ | 0–5 |
| $Na_2O + K_2O$ | 15–20 |
| $TiO_2$ | 10–15 |
| CuO | 3–7 |
| Other compatible oxides | 0–10 |

Examples of other compatible oxides include PbO, $B_2O_3$, $Li_2O$, SnO, MgO, $ZrO_2$, CaO, BaO, and the like. Preferably, however, no other oxides are employed. A particularly preferred glass of Type II consists of:

Glass Composition B

| Constituent | Approx. Wt. % |
|---|---|
| $SiO_2$ | 45.4 |
| $Al_2O_3$ | 20.6 |
| $TiO_2$ | 12.5 |
| CuO | 5.0 |
| $Na_2O$ | 16.5 |
| Properties of Product (Cu layer = about 1-3 mils thick) | |
| Coeff. of exp. (× $10^{-7}$ cm/cm/°C, 0–300°C) | |
| glass | 92 |
| glass ceramic | 110 |
| sheet resistance (ohms/sq.) | 0.022 |
| solderability | good |
| adhesion (stand. pull test, lbs. 0.1 inch pad) | 3.2 |
| dielectric constant (K) | 8 |
| dissipation factor (D) % | 10.9 |
| loss factor (K × D) | 0.87 |
| predom. cryst. phase | NaAl silicate |

TYPE III

| Constituent | Approx. Wt. % |
|---|---|
| $SiO_2$ | 40–50 |
| $Al_2O_3$ | 20–30 |
| $TiO_2$ | 1–10 |
| CuO | 3–7 |
| MgO | 5–8 |
| $ZrO_2$ | 0–8 |
| $TiO_2 + ZrO_2$ | at least about 6% |
| Compatible oxides | 0–10 |

Examples of compatible oxides include $Li_2O$, PbO, $B_2O_3$, BaO, SnO, etc., well known in the art. A particularly preferred glass composition of Type III consists of:

Glass Composition C

| Constituent | Approx. Wt. % |
|---|---|
| $SiO_2$ | 43.5 |
| $Al_2O_3$ | 28.5 |
| $Li_2O$ | 0.6 |
| MgO | 6.6 |
| BaO | 3.8 |
| $ZrO_2$ | 6.6 |
| $TiO_2$ | 1.7 |

-Continued

Glass Composition C

| Constituent | Approx. Wt. % |
|---|---|
| CuO | 5.0 |
| PbO | 1.9 |
| $B_2O_3$ | 1.0 |
| $F_2$ | 0.9 |
| Properties of Product (Cu layer = about 1-3 mils thick) | |
| Coeff. of exp. (× $10^{-7}$ cm/cm/°C) | |
| glass | 35 |
| glass ceramic | 73 |
| sheet resistance (ohms/sq.) | 0.146 |
| solderability | OK |
| adhesion (stand. pull test, lbs., 0.1" pad) | 3–6 |
| dielectric constant (K) | 6.7 |
| dissipation factor (D) % | 0.86 |
| loss factor (K × D) | 0.057 |
| Predominant crystalline phase = | high quartz solid sol. |

The glass compositions of this invention may be melted from conventional batch ingredients and formed into desired shapes using standard techiques.

As alluded to hereinabove, the glass compositions of this invention in shaped-glass form are readily converted into copper layer bearing glass ceramics by subjecting them to a heat treatment. In a preferred technique, the first step in the heat-treatment is to subject the glass structure to an oxidizing atmosphere (e.g. air, oxygen, or mixtures thereof) at a sufficient temperature and time to cause migration of copper ions to the surface to form a significant layer of CuO thereon. Such a treatment may be effected after crystallization or be used to simultaneously effect crystallization of the object. Thereafter, the glass-ceramic structure is subjected to a reducing atmosphere or environment at a temperature usually lower than that of the first heat-treatment and for a sufficient period of time to reduce the CuO to a conductive layer of metallic copper.

As stated this two-step heat treatment is preferred because it appears to optimize the quality of the layer so formed. This is not to say, however, that it is critical. Actually a one-step heat treatment may be used wherein crystallization, ion migration, and reduction are all carried out in a reducing atmosphere. Such a one-step technique usually is conducted at a higher temperature than the reducing step of the two-step technique in order to insure that crystallization takes place. Generally speaking, this one-step technique usually results in a thinner, more porous film of metallic copper. In those instances where such a layer is tolerable, economics may render this one-step technique more desirable.

Different times and temperatures for the heat treatments are preferably employed for each type of glass. In those instances where the geometrical tolerances are critical it is often preferred to precrystallize the glass prior to the cutting and grinding operations of the parts in order to avoid the rather inaccurate necessity of estimating shrinkage during crystallization and/or encountering camber. In those instances, however, where precise substrate dimensions are not required it is most convenient for economic purposes, etc., to combine the crystallization and oxidizing heat-treatments.

Typical and preferred heat-treatment schedules for each of the three types of glasses contemplated by this invention are as follows (assuming conventional substrates of standard thicknesses):

TYPE I

1. Oxidation heat treatment — heat in air, oxygen, or synthetic mixtures thereof at about 750°–850°C., preferably about 800°C., for 4–20 hours, preferably 16 hours.

2. Reduction heat treatment — heat in a reducing environment, preferably a gaseous environment containing at least about ½% $H_2$ and most preferably a forming gas environment (90% $N_2$ – 10% $H_2$) at about 450°–600°C. (preferably about 500°C.) for about 5–60 minutes (preferably about 15 minutes).

TYPE II

1. Oxidation heat treatment — same as type I above except at about 800°–900°C. (pref. 825°C.) for 4–24 hours (preferably 16 hours).

2. Reduction heat treatment — same as Type I.

TYPE III

1. Oxidation heat treatment — same as Type I above except at about 800°–900°C. (preferably 825°C.) for 16–64 hours (preferably 24 hours).

2. Reduction heat treatment — same as Type I.

In all of the above heat-treatments, the vitreous glass will be inherently crystallized during the oxidizing heat treatment step. If precrystallization is desired, the oxidizing heat treatment times and temperatures may be employed first to precrystallize and then in an additional step after cutting, grinding, and the like to effect the generation of the CuO coating.

Once the compositions of this invention have been formed into a substrate containing a tightly adherent copper in situ coating thereupon, it may be used directly in a wide variety of environments within the microelectronic and printed circuit art. Since no insulating siliceous layer coats the metallic copper layer upon its formation no acid etching as per the prior art is necessary. In addition, the coating formed is of such a good quality copper that excellent solderability with conventional conductor leads (e.g. Kovar) is obtained.

The various properties of products formed from preferred specific compositions are given hereinabove. From this data, there may be derived several generalizing characteristics for each of the three types of glasses contemplated by this invention. Firstly, the compositions of Type I, and particularly composition A, form products which exhibit excellent conductor characteristics, both mechanical and electrical. On the other hand their dielectric characteristics are not as good as those of Types II and III. For this reason it is particularly preferred to use Type I compositions in those environments where high mechanical strengths and conduction are required but where the circuit is not being subjected to high frequencies and/or power densities.

One particular area in which Type I compositions find particularly suitable use is in the "flip chip" package for integrated circuits. Heretofore such a package had to be produced by soldering a lead frame to the conductor leads on the same side of the substrate having the silicon integrated "flip chip" located thereon. Now, because of the ability to easily form an electronically conductive hole or via from one side of the substrate to the other, the frame may be more conveniently connected to the side of the substrate opposite that of the silicon chip. A typical tecnhique for producing such a package in accordance with this invention is to:

*a.* form the desired shaped substrate having a Cu coating thereupon as per the above using any of the three types of glasses, but most preferably of Type I, the substrate having Cu coated holes strategically located therein,

*b.* form the desired conductor pattern, preferably by standard photoetch techniques in the Cu layer,

*c.* mount the "flip chip" integrated circuit upon the conductor pattern and mount a lead frame so as to connect the leads to their corresponding conductor areas on the other side of the substrate,

*d.* solder and seal both the lead frame and chip to the substrate, and

*e.* package the entire component in plastic as per conventional techniques.

As stated, Type I compositions are preferred in this "flip chip" embodiment since such packages are generally not called upon to carry or employ high frequencies and/or power densities. On the other hand, the packaging-in-plastic step by its nature tends to subject the sub-assembly to shock and other maltreatment. Because of the excellent mechanical strength of the various joints and bends formed when using compositions of Type I, high reliability and low numbers of rejects are obtained despite this maltreatment.

While Types II and III may also be used in the "flip chip" package, they generally exhibit lower conductor characteristics (both mechanical and electrical) than does Type I and thus are less desirable to use. On the other hand, Types II and III generally exhibit significantly better dielectric properties such as lower dielectric constants, lower dissipation factors, and lower loss factors than Type I. These two types of glass compositions are therefore usually most preferably employed where high conductor characteristics are of secondary importance to dielectric characteristics. One example of such an environment is a printed circuit board which must carry or employ high frequencies and/or high power densities. Generally speaking Type I compositions are less desirable to use as frequencies approach the microwave range and/or power densities approach about 100 watts/in.$^2$. From the point of view of a comparison between Types II and III, Type II is intermediate between Types I and III in both conductor characteristics and dielectric properties. Thus this invention provides a spectrum of compositions for use throughout the many environments of the microelectronic and printed circuit art.

The following examples are presented by way of illustration and not limitation.

EXAMPLE I

The following batch ingredients were blended and heated to 2,300°F. for 22 hours in an electric furnace using a platinum crucible with continuous mechanical stirring in order to form a homogeneous glass of composition A above:

| Constituent | Batch Parts by Wt. |
|---|---|
| Kesil Quartz | 1424.8 |
| Iwatani Alumina | 503.1 |
| calcium carbonate | 534.6 |
| magnesium carbonate | 205.2 |
| potassium carbonate | 368.1 |

-Continued

| Constituent | Batch Parts by Wt. |
|---|---|
| titanox F.M.A. | 1005.5 |
| Florida Zircon | 227.3 |
| barium carbonate | 129.1 |
| cupric oxide | 250.5 |
| sodium carbonate | 1282.3 |

The molten glass so formed was cast into a preheated mold (650°F.) and annealed at 940°C. to obtain a billet 2 inches × 4 inches × 8 inches. This billet was then precrystallized by heating it in air at 800°C. for 16 hours. The predominant crystalline phase was NaCa silicate. The billet was then sliced using a standard diamond saw to obtain a substrate 1 inch × 2 inches × 0.025 inch. The Glass-ceramic was easily cut, and the cut surface, quite surprisingly, was so smooth that no griding thereof was necessary. The sides of the substrate were then trimmed to provide precise dimensions for later use. Holes on the order of about 8–10 mils in diameter were then provided at selected locations through the 0.025 inch thick substrate using a Sheffield Cavitron (a conventional ultrasonic drill).

The so formed substrate was then heated in air at 800°C. for 16 hours wherein after it was cooled to 500°C. and the atmosphere was purged with nitrogen and then switched to forming gas (90% $N_2$ –10% $H_2$). The substrate was then held for 15 minutes at 500°C. in the forming gas whereupon a continuous even coating of copper of about 1–3 mils in thickness was formed. The holes were also found to be evenly coated and conductively connected the coated sides of the substrate. The properties of the coated substrate are those reported relative to the "Composition A" table hereinabove.

This substrate, so formed may now be used in a variety of environments, two examples of which are set forth as follows:

A. Flip Chip Package

By providing the above described coated holes in the requisite pattern a flip chip integrated circuit package is manufactured as follows:

*a.* apply to the substrate a conventional photoresist composition to the copper coating,

*b.* expose the photoresist through a mask to produce the requisite latent image for forming a conductor pattern of the copper coating,

*c.* develop photoresist latent image with photoresist developer,

*d.* etch, using a conventional etchant such as $FeCl_3$, to produce Cu conductor pattern,

*e.* clean off masking compounds,

*f.* separate large substrate into individual substrates by conventional methods,

*g.* mount flip chip and attach assembly to the lead frame as described above,

*h.* seal and solder components, and

*i.* encapsulate sub-assembly in plastic to form package.

B. Printed Circuit Board

By providing a substrate as formed except using a billet of dimensions 2½ inches × 2½ inches × 6 inches a printed circuit board may be readily formed. Generally speaking, after slicing, the substrate is trimmed and ground using a 600 grit silicon carbide powder to obtain a very smooth surface and dimensions of about 2 × 2 × 1/16 inches. Holes are similarly provided as in A above, and photoetching as described is carried out to achieve the desired printed conductor pattern. The substrate is then conventionally mounted in the environment in which it is to be used.

EXAMPLE II

By way of comparison and in order to show the unique contribution which this invention makes to the art, the procedures of U.S. Pat. No. 3,231,456 were twice reproduced, each reproduction being by a different individual. The compositions reproduced for evaluation were Compositions II and VIII from the table at the bottom of page 1 of this patent. Each reproduction stated with a separately formulated batch to produce each of the recited compositions. The compositions so produced were chemically analyzed and found to be very close to the exact percentages reported in the table of the patent. For example, one of the reproductions analyzed as consisting of:

| Constituent | II Theoretical | Analyzed |
|---|---|---|
| $SiO_2$ | 63.7 | 63.9 |
| $Li_2O$ | 18.0 | 17.8 |
| $Al_2O_3$ | 10.9 | 10.9 |
| $P_2O_5$ | 4.4 | 4.1 |
| CuO | 2.0 | 1.9 |
| SnO | 1.0 | 0.96 |

The melting procedures employed were those outlined in column 4, lines 26–32 of the patent. The following table lists the melting procedure for both compositions:

| | |
|---|---|
| Size of melt | 500 gm. |
| Temperature | 2400°F. |
| Time | 6 hrs. |
| Atmosphere | air |
| Crucible | $SiO_2$ |
| Furnace | electric |

Good glasses were obtained from both compositions. The following table lists the melting data:

| | II | VIII |
|---|---|---|
| seeds | none | none |
| devitrif. | none | none |
| homogeneity | good | good |
| color | light blue, transp. | light blue, transp. |
| surface | copper oxide film | copper oxide film |
| annealing | 480°C. (1 hr.) | 480°C. (1 hr.) |

Samples were cooled, after annealing, at a rate not exceeding 5°C./min.

Slices were cut from the slabs and ground to a smooth finish on one side with 600 grit grinding powder. Final sample dimensions were approximately, 1 inch × 1 inch × 1/16 inch. The samples were carefully cleaned with acetone before heat treatment.

The following heat-treatment cycle was employed. This heat-treatment is that described in column 4, lines 33–50 of the patent.

| Heat Treatment | Atmosphere |
|---|---|
| room temp. | $0_2$ |

-Continued

| Heat Treatment | Atmosphere |
|---|---|
| 5°C./Min. rise | $O_2$ |
| 500°C./1 hr. | $O_2$ |
| 5° C./min. rise | $O_2$ |
| 600°C. (1 hr.) | furnace purged with $N_2$ for 10 min. Then forming gas was started. |
| 5°C./min. rise | forming gas |
| 850°C. (1 hr.) | forming gas |
| furnace rate cool | forming gas |
| room temperature | forming gas |

Both reproductions yielded substantially the same results. A film having the appearance of copper was present after heat treatment in both compositions. However, a check for conductivity with a Simpson volt-ohm-milliamp meter showed no conductivity. It was therefore assumed that a thin siliceous film covered the copper-colored film as claimed in the patent.

Example II was etched for 50 minutes in 2 percent hydrofluoric acid as in the patent, column 4, lines 51 through 55. While copper-colored film still remained, testing still showed no conductivity. In an attempt to remove more of the supposed siliceous layer, etching was continued with 4 percent HF for another 30 minutes, but the surface was still not conductive. Example VIII was treated with a 2 percent solution of hydrofluroic acid for 5 minutes according to the procedure outlined in column 5, lines 5–14 of the patent, and showed no conductivity at all, but it appeared that the colored film had been partially removed by the etchant.

The above comparison with the prior art amply evidences the valuable contribution presented by this invention. Once given the above disclosure may other features, modifications, and improvements will become apparent to the skilled artisan. Such other features, modifications, and improvements are thus considered to be a part of this invention the scope of which is to be determined by the following claims.

I claim:

1. A process for forming a coated glass ceramic object wherein the coating is an in situ coating of conductive metallic copper which process comprises forming a melt of a composition consisting essentially of in weight percent the stated compounds in the stated percentages, said composition being selected from the group consisting of:

A. 25–35% $SiO_2$, 5–13% $Al_2O_3$, 3–9% CaO, MgO, 10–20% $Na_2O$, 0–10% $K_2O$, wherein the sum of $Na_2O + K_2O$ is 15–25%, 15–25% $TiO_2$, 0–5% $ZrO_2$, 3–7% CuO and 1–5% BaO;

B. 40–50% $SiO_2$, 15–25% $Al_2O_3$, 10–20% $Na_2O$, 0–5% $K_2O$, wherein the sum of $Na_2O + K_2O$ is 15–20%, 10–15% $TiO_2$ and 3–7% CuO; and C. 40–50% $SiO_2$, 20–30% $Al_2O_3$, 1–10% $TiO_2$, 3–7% CuO, 5–8% MgO, 0–9% $ZrO_2$ and wherein the sum of $TiO_2 + ZrO_2$ is at least 6%, forming a shaped object from said melt, heating said object and thereby forming a glass ceramic object, and causing migration of copper ions to the surface thereof, and heating the shaped object in a reducing atmosphere for a period of time sufficient to form a conductive layer of metallic copper thereon.

2. A process according to claim 1 wherein the heating to form a glass ceramic object and the heating in a reducing atmosphere are conducted simultaneously.

3. A process according to claim 1 wherein the glass object is heated in an oxygen-containing atmosphere to form a glass ceramic object and said heating in a reducing atmosphere is thereafter conducted at a lower temperature.

4. A process according to claim 1 wherein said composition is (A) and wherein said object is heated in an oxygen-containing atmosphere at about 750°–850°C for 4–20 hours and said heating in a reducing atmosphere is effected at about 450°–600°C for about 5–60 minutes.

5. A process according to claim 1 wherein said composition is (B) and wherein said object is heated in an oxygen containing atmosphere at about 800°–900°C. for about 4–24 hours and said heating in a reducing atmosphere is effected at 450°–600°C. for 5–60 minutes.

6. A process according to claim 1 wherein said composition is (C) and wherein said object is heated in an oxygen-containing atmosphere at about 800°–900°C. for about 16–64 hours and said heating in a reducing atmosphere is effected at about 450°–600°C. for about 5–60 minutes.

7. A process according to claim 1 wherein said composition is (A) and consists essentially of by weight about: 30% $SiO_2$, 10% $Al_2O_3$, 4% MgO, 6% CaO, 2% BaO, 3% $ZrO_2$, 20% $TiO_2$, 5% CuO, 15% $Na_2O$, and 5% $K_2O$, wherein crystallization is effected at about 800°C. for 16 hours and reduction is effected in forming gas at about 500°C. for 15 minutes and the product so formed has about the following properties:

| | |
|---|---|
| coeff. of thermal expansion (× $10^{-7}$ cm/cm/°54 0–300°C.) | |
| glass | 110 |
| glass ceramic | 128 |
| sheet resistance (ohms/sq.) | 0.028 |
| solderability | excellent |
| adhesion | 7.6 lbs. |
| dielectric constant (K) | 21.3 |
| dissipation factor (D) % | 19.2 |
| loss factor (K × D) | 4.1 |
| predominant crystal. phase | NaCa silicate. |

8. A process according to claim 1 wherein said composition is (B) and consists essentially of by weight about: 45.4% $SiO_2$, 20.6% $Al_2O_3$, 12.5% $TiO_2$, 5% CuO, and 16.5% $Na_2O$, wherein crystallization is effected at about 825°C. for 16 hours and reduction is effected in forming gas at about 500°C. for 15 minutes and the products so formed has about the following properties:

| | |
|---|---|
| coeff. of expansion (× $10^{-7}$ cm/cm/°C., 0–300°C.) | |
| glass | 92 |
| glass ceramic | 110 |
| sheet resistance (ohms/sq.) | 0.022 |
| solderability | good |
| adhesion | 3.2 lbs. |
| dielectric constant (K) | 8 |
| dissipation factor (D) % | 10.9 |
| loss factor (K × D) | 0.87 |
| predominant crystal. phase | NaAl silicate. |

9. A process according to claim 1 wherein said composition is (C) and consists essentially of by weight about 43.5% $SiO_2$, 28.5% $Al_2O_3$, 0.6% $Li_2O$, 6.6% MgO, 3.8% BaO, 6.6% $ZrO_2$, 1.7% $TiO_2$, 5.0% CuO, 1.9% PbO, 1.0% $B_2O_3$, and 0.9% $F_2$, wherein crystallization is effected at about 825°C. for about 24 hours and reduction is effected in forming gas at about 500°C. for 15 minutes and the product so formed has about the following properties:

| | |
|---|---|
| coeff. of expansion ($\times 10^{-7}$ cm/cm/°C., 0–300°C.) | |
| glass | 35 |
| glass ceramic | 73 |
| sheet resistance | 0.146 |
| solderability | OK |
| adhesion | 3–6 lbs. |
| dielectric constant (K) | 6.7 |
| dissipation factor (D) % | 0.86 |
| loss factor (K × D) | 0.057 |
| predominant crystal. phase | high quartz solid sol. |

10. A process for forming a coated glass ceramic body wherein the coating is an in situ coating of conductive metallic copper which process comprises thermally in situ crystallizing a glass body having a composition consisting essentially of in weight percent the stated compounds in the stated percentages, said composition being selected from the group consisting of:

A. 25–35% $SiO_2$, 5–13% $Al_2O_3$, 3–9% CaO, 0–7% MgO, 10–20% $Na_2O$, 0–10% $K_2O$, wherein the sum of $Na_2O$ + $K_2O$ is 15–25%, 15–25% $TiO_2$, 0–5%, $ZrO_2$, 3–7% CuO and 1–5% BaO;

B. 40–50% $SiO_2$, 15–25% $Al_2O_3$, 10–20% $Na_2O$, 0–5% $K_2O$, wherein the sum of $Na_2O$ + $K_2O$ is 15–20% 10–15% $TiO_2$ and 3–7% CuO; and C. 40–50% $SiO_2$, 20–30% $Al_2O_3$, 1–10% $TiO_2$, 3–7% CuO, 5–8% MgO, 0–8% $ZrO_2$ and wherein the sum of $TiO_2$+ $ZrO_2$ is at least 6%, wherein copper ions migrate to the surface of said body during said thermal in situ crystallization, and heating the body in reducing atmosphere for a period of time sufficient to form a conductive layer of metallic copper thereon.

11. A coated crystallized glass body having in situ formed metallic copper coating on its surface and produced by the process of thermal in situ crystallization of a glass body and the heating of the resulting crystallized glass body in a reducing atmosphere, said glass composition consisting essentially of in weight percent the stated components in the stated percentages, said composition being selected from the group consisting of:

A. 25–35% $SiO_2$, 5–13% $Al_2O_3$, 3–9% CaO, 0–7% MgO, 10–20% $Na_2O$, 0–10% $K_2O$, wherein the sum of $Na_2O$ + $K_2O$ is 15–25%, 15–25% $TiO_2$, 0–5% $ZrO_2$, 3–7% CuO, and 0–5% BaO;

B. 40–50% $SiO_2$, 15–25% $Al_2O_3$, 10–20% $Na_2O$, 0–5% $K_2O$, wherein the sum of $Na_2O$ + $K_2O$ is 15–20%, 10–15% $TiO_2$, and 3–7% CuO; and C. 40–50% $SiO_2$, 20–30% $Al_2O_3$, 1–10% $TiO_2$, 3–7% CuO, 5–8% MgO, 0–8% $ZrO_2$, and wherein the sum of $TiO_2$ + $ZrO_2$ is at least about 6%.

12. The crystallized glass body as defined in claim 11 wherein said glass composition is (A) and wherein at least about 90% by weight of said glass composition is made of $SiO_2$, $Al_2O_3$, CaO, $Na_2O$, $TiO_2$, $K_2O$, and CuO.

13. The crystallized glass body as defined in claim 11 wherein said glass composition is (B) and wherein said glass composition contains no more than about 10% weight of other compatible oxides.

14. The crystallized glass body as defined in claim 11 wherein said glass composition is (C) and wherein said glass composition contains no more than about 10% by weight of other compatible oxides.

* * * * *

UNITED STATES PATENT AND TRADEMARK OFFICE

CERTIFICATE OF CORRECTION

PATENT NO. : 3,914,517

DATED : Oct. 21, 1975

INVENTOR(S) : Perry P. Pirooz

It is certified that error appears in the above-identified patent and that said Letters Patent are hereby corrected as shown below:

Col. 7, line 11, "940°C" should read --- 940°F ---; col. 7, line 18, "griding" should be --- grinding ---.

Col. 9, line 35, "may" should be --- many ---.

Col. 10, line 32, after "°", delete "54" and insert therefor --- C., ---.

Signed and Sealed this

Nineteenth Day of April 1977

[SEAL]

Attest:

RUTH C. MASON
*Attesting Officer*

C. MARSHALL DANN
*Commissioner of Patents and Trademarks*